United States Patent
Fitch

[11] Patent Number: 5,947,515
[45] Date of Patent: Sep. 7, 1999

[54] DRIVER SAFETY CAPSULE

[76] Inventor: John C. Fitch, 433 Salmon Kill Rd., Lime Rock, Lakeville, Conn. 06039

[21] Appl. No.: 08/917,261

[22] Filed: Aug. 25, 1997

[51] Int. Cl.$^6$ .................................................. B60R 21/02
[52] U.S. Cl. ...................... 280/748; 297/487; 297/216.1
[58] Field of Search ....................... 280/748; 297/216.1, 297/487, 250.1, 256.15, 216.16, 216.18, 216.12; 244/122 R, 122 A

[56] References Cited

U.S. PATENT DOCUMENTS

| | | |
|---|---|---|
| 2,401,748 | 6/1946 | Dillon . |
| 3,165,355 | 1/1965 | Hitchcock et al. . |
| 3,713,695 | 1/1973 | Von Wimmersperg . |
| 3,922,030 | 11/1975 | Stedman . |
| 3,951,429 | 4/1976 | Satzinger . |
| 4,477,041 | 10/1984 | Dunne . |
| 4,739,953 | 4/1988 | Soffiantini . |
| 4,754,999 | 7/1988 | Kain ........................................ 297/250 |
| 4,784,352 | 11/1988 | Smith et al. . |
| 4,923,147 | 5/1990 | Adams et al. . |
| 5,131,608 | 7/1992 | Ash et al. . |
| 5,161,275 | 11/1992 | Simpson et al. ............................. 5/627 |
| 5,685,603 | 11/1997 | Lane ................................... 297/216.11 |

*Primary Examiner*—Paul N. Dickson
*Attorney, Agent, or Firm*—David A. Tamburro

[57] ABSTRACT

A driver safety capsule or cell for a race car, the cell encapsulating and protecting the entire body of the driver. After a collision, the capsule and the driver immobilized therein are removable together from the car so that further head or spinal injury is avoided. Inertial tethers restrain movement of the driver's head and shoulders out of the capsule. A chest plate transforms impact forces to the capsule, minimizing injury to the chest.

9 Claims, 3 Drawing Sheets

DRIVER SAFETY CAPSULE

This invention relates generally to safety devices for race car drivers, and more particularly to a novel full body encapsulating cell or capsule which replaces the standard seat in a race car.

Race cars are frequently driven at speeds of about 200 miles/hour. When a collision occurs, inertial forces are produced which can cause severe injuries and even death to the driver. Attempts have been made to design special seats having shoulder and body harness systems for race cars in order to try to minimize these injuries. While these prior designs provide some protection to the driver, substantial improvement is still needed.

One of the major drawbacks of prior systems is that, following a collision, medical personnel have to remove the injured driver from the seat, fit him on a backboard or gurney, and place him into an ambulance or other medical vehicle. This handling of the injured driver often causes further injury, particularly to the head, neck, and spinal areas. Obviously avoiding such movement and resultant nerve and spinal damage is desirable.

SUMMARY OF THE INVENTION

A primary object of the invention is to provide a novel capsule or cell which surrounds and protects the driver, but yet leaves him free enough to steer, to brake, and to shift gears of the car. The capsule can be integrated into the design of the car, replacing the normal seat, so that after a collision the capsule and an injured driver immobilized in the capsule can be removed together from the car, thus avoiding further injury to the driver.

Another object of the invention is to provide the above described novel capsule which is configured in the shape of a trough and extend from the back of the head to the heel of the foot, thus protecting the whole body of the driver. The capsule is mounted in the car for controlled forward movement after impact in order to absorb the forces of impact. A tether extends from the back of the driver's helmet to an inertial reel and retractor mounted on the capsule, the tether paying out at a controlled rate upon impact to prevent brain trauma. The helmet normally fits within a protective padded surround headrest of the capsule and, in a repeated impact situation, the retractor retracts the helmet back into its protected position within the padded headrest after each impact.

The novel capsule also includes a wide chest plate which upon impact transfers the impact forces to the sides of the capsule. Any load imposed on the chest is distributed over a larger area thus eliminating high pressure points.

In addition the trough-shaped capsule has sidewalls which protect the torso and legs of the driver.

Other objects and advantages will become apparent from reading the following detailed description of the invention wherein reference is made to the accompanying drawings.

DETAILED DESCRIPTION OF THE INVENTION

Figure 1:
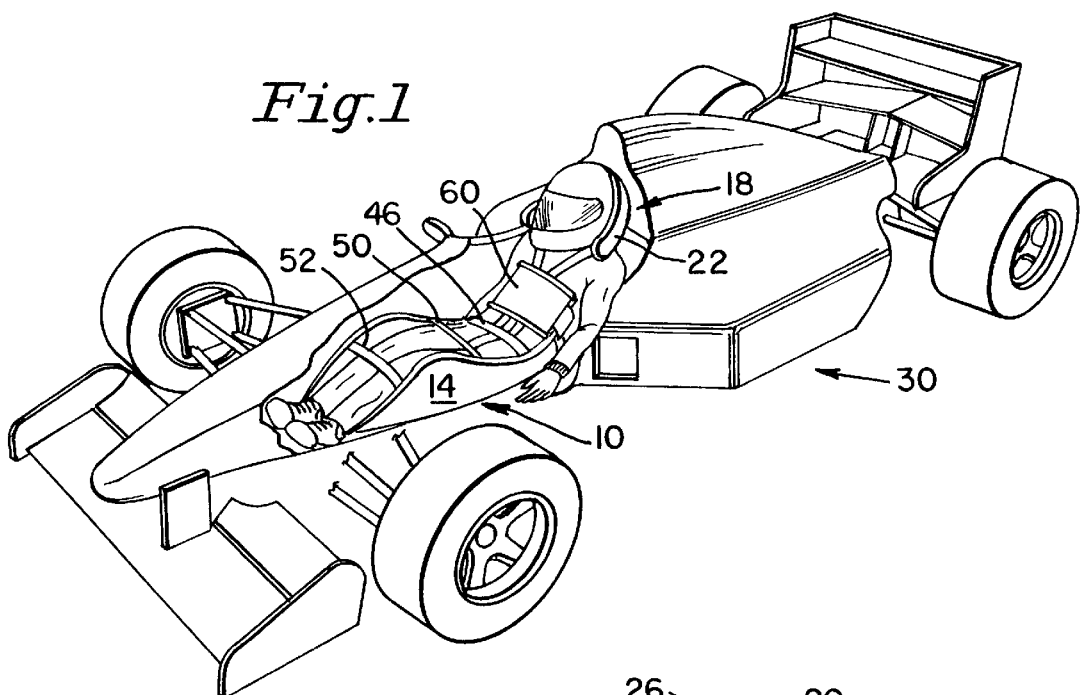
FIG. 1 is a right side perspective view of the novel seat or capsule mounted in a race car, with a driver harnessed into the capsule.
Figure 2:
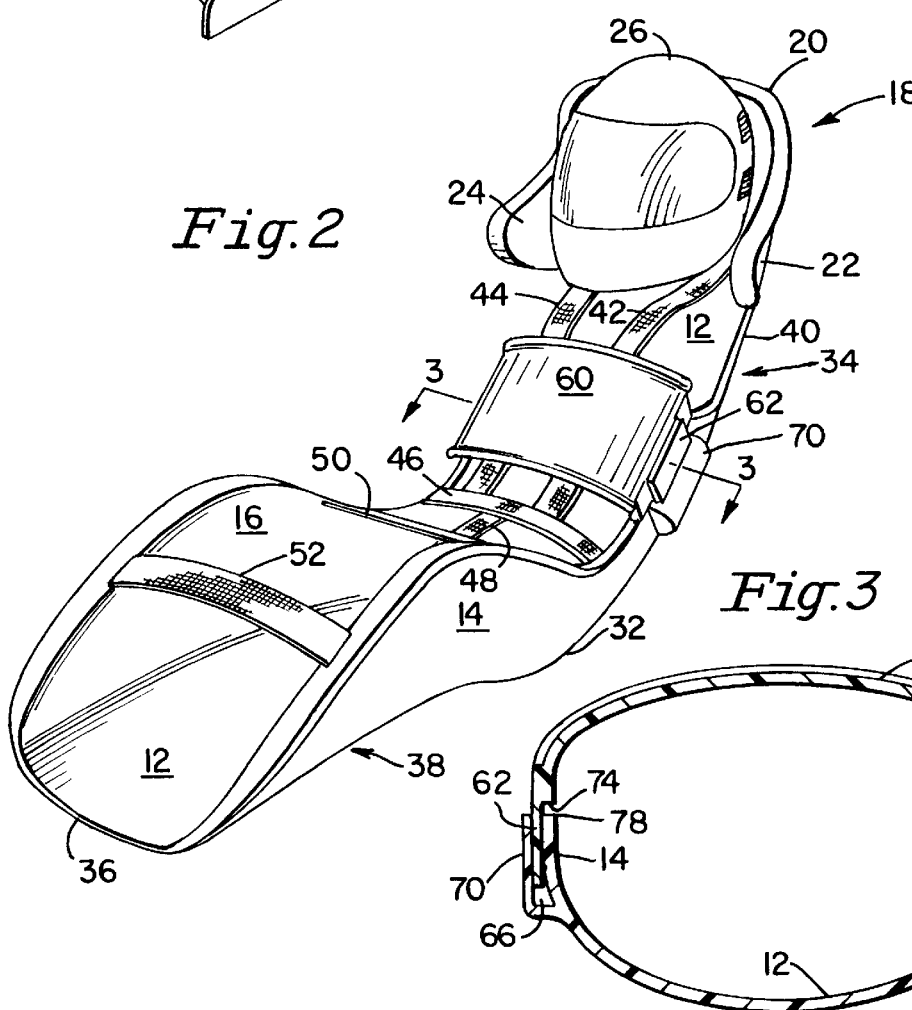
FIG. 2 is an enlarged, right side perspective view of the capsule, with a helmet positioned within the padded surround headrest.
Figure 3:
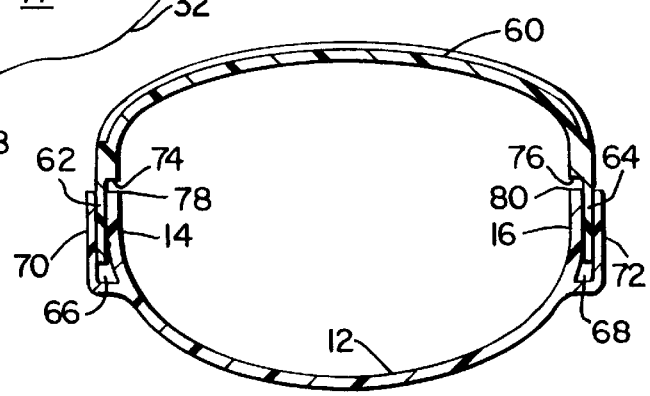
FIG. 3 is a section view taken along line 3—3 of FIG. 2 illustrating the chest plate.

Referring now to the drawings the novel protective trough-shaped plastic capsule 10 of the invention includes a contoured center or base wall 12, contoured side walls 14 and 16, and a padded headrest 18 connected to the upper end of wall 12 and including a circular rear wall 20 and forwardly extending wings 22 and 24 which together closely surround a driver's helmet 26 and provide full lateral angularity protection.

Figure 4:
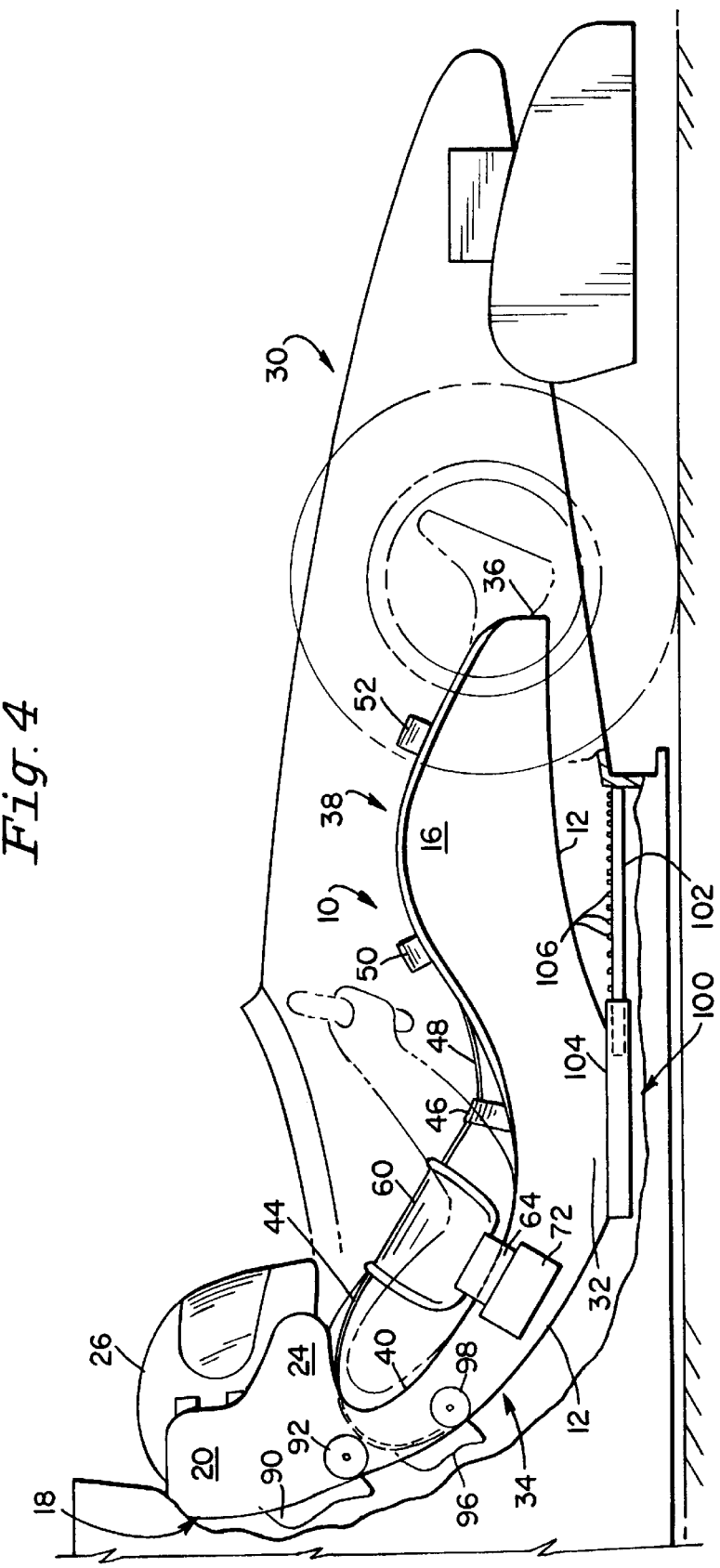
FIG. 4 is a left side elevation view of the capsule mounted in the car of FIG. 1 with the driver's arms and feet shown in phantom.

As shown in FIGS. 1 and 4, capsule 10 is contoured in such a way so that when it is mounted in a race car 30 it comfortably seats a driver in a proper driving position. Wall 12 curves downwardly from headrest 18 to seatrest section 32 forming a concave torso receiving section 34. Wall 12 then curves upwardly in convex fashion from seat section 32 to terminal end 36 to form a leg supporting section 38. The capsule extends from the back of the head of the driver at headrest 18 to the heel of the foot at terminal edge 36. The driver is retained in the capsule by a harness assembly including shoulder straps 42 and 44, waist strap 46, and a crotch strap 48. A thigh strap 50 and a leg strap 52 are also provided. Straps 46, 48, 50 and 52 are connected to the capsule, The upper end of shoulder straps 42 and 44 are connected to an inertial tether 96 as will be described later.

Sidewalls 14 and 16 extend through the leg and chest areas of the capsule, but are cut out at the shoulder and arm areas to provide side openings 40 which permit free movement of the driver's arms. The driver's feet are also freely movable. Consequently, the driver is free to steer, brake, and shift gears as necessary.

A wide chest protector plate 60 extends between side walls 14 and 16 across the chest of the driver and includes flexible tongues 62 and 64 which slide loosely into slots 66 and 68 formed by plates 70 and 72 fixed to sidewalls 14 and 16. The tongues retain plate 60 on capsule 10, but in a loose free floating fashion allowing the driver freedom to perform the driving task. The inner edges 74 and 76 of plate 60 oppose upper edges 78 and 80 of sidewalls 14 and 16. When a force impacts against plate 60 pressing the plate inwardly, edges 74 and 76 engage against edges 78 and 80 to transfer that load directly to sidewalls 14 and 16, rather than against the driver's chest. If the force is great enough to flex plate 60 inwardly, some of the force may be imposed on the chest, but it is distributed over a wide area because of the size of plate 60. When an inertial force acts to move the driver forwardly out of the capsule, plate 60 similarly spreads that force over a larger chest area to avoid concentrated pressure points which would result from the use of the harness straps alone.

Upon impact, to prevent against excessive sudden forward movement of the drivers head, one end of an inertial tether 90 passes through headrest 18 and is attached to the back of helmet 26, and the other end of tether 90 is attached to an inertial reel 92 with sufficient slack to allow complete freedom of movement of the helmet within the surround headrest 20. Inertial reel 92 is mounted on capsule 10 and includes a retractor which is activated by an accelerometer.

On impact, the inertial reel controls the payout on tether 90 to restrain forward movement of the helmet within safe limits. In case of multiple impacts in the course of a crash, the retractor is activated after each impact to return the helmet back into the protective headrest 18 at a controlled rate. In this way the action of the inertial reel 92 can be exploited in secondary impacts, and the lateral protection afforded by the wings 22 and 24 adjacent the sides of the helmet will again be operable.

In severe impacts conventional harness straps may stretch and the driver's shoulders may deform, moving the upper body and neck forward ahead of the driver's head within helmet 26 which is being restrained by tether 90. This may cause the driver's neck to break. To avoid this, a second tether 96 has one end passing through wall 12 and attached to the upper end of straps 42 and 44 which extend around the shoulders of the driver and its other end attached to an inertial reel 98 mounted on capsule 10. Reel 98 is the same type as reel 92 and the two tethers 90 and 96 will be synchronized to payout at the same rate. Tether 96 will restrain the shoulders and prevent the upper body and neck from moving forward ahead of the helmet and head.

In race cars there is a valuable distance between the helmet position prior to an impact and its position when it contacts the interior of a car. Conventional seats which are fixed in place in the cockpit do not exploit this valuable distance to achieve a lower and survivable G level without a severe peak upon final contact. This is because the muscular strength of even a very fit young driver is insignificant compared to the momentum generated by a racing level impact. (Head+helmet 15 lbs×30 G's=450 lbs.)

To take advantage of this distance, capsule 10 is mounted in the car for controlled forward movement by way of an energy absorbing mounting assembly 100. Assembly 100 includes one or more tracks 102 fixed in the car and cooperating tubes 104 fixed on seatrest section 32 of capsule 10 and adapted to telescopically slide forwardly on tracks 102. A plurality of shear pins 106 are fixed on top of track 102. In the event of a collision, capsule 10 will move forwardly against the resistance of shear pins 106, which absorb energy as they are sheared and reduce the force with which the driver may ultimately strike any part of the interior of the car. This controlled travel further reduces the risk of fatal brain shock, as well as reduces the forces acting on the driver's body.

Thus, the controlled travel of capsule 10 permitted by mounting assembly 100, e.g. two feet, combined with the controlled payout of tethers 90 and 96, e.g. two feet, represent a bonus available in the car to mitigate crash forces and reduce or avoid injury to the driver.

Instead of the illustrated shear pin design other retarding and energy absorbing means such as hydraulic or pneumatic cylinders may be used to control the forward movement of capsule 10.

Also, capsule 10 is readily removable from mounting assembly 100 so that after a collision the capsule and the driver immobilized therein can be removed together from the car. In this way the capsule performs the function of a backboard, reducing the risk of further injury to the neck and spine while extracting the driver from the car.

Figure 5:
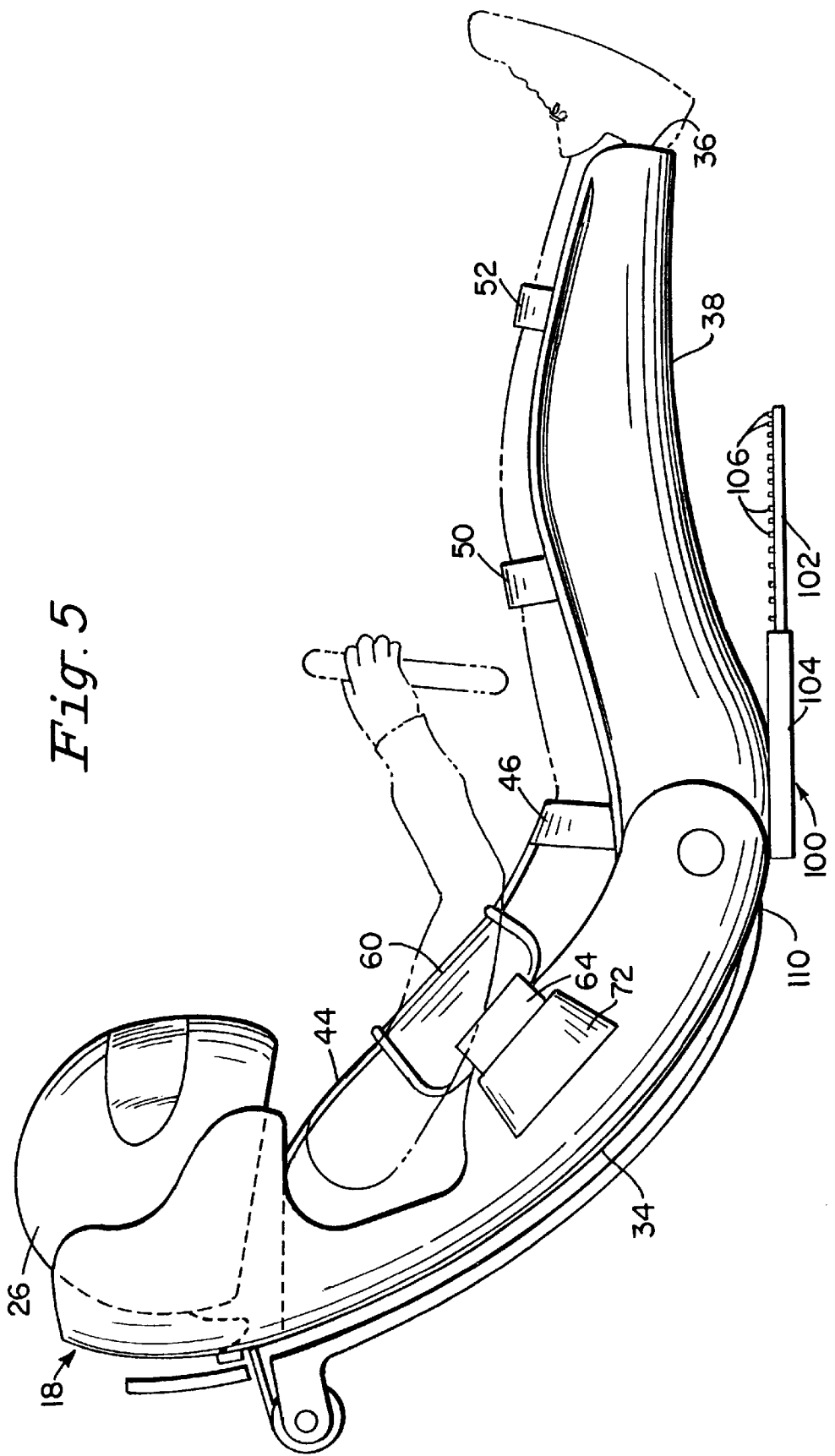
FIG. 5 illustrates the capsule formed in two pieces pivotally joined together by hinges in the hip area.

Capsule 10 may be formed in two pieces 34 and 38 joined together in the hip area by releasable hinges 110 (FIG. 5). In some situations this may facilitate removal of the capsule and driver from the car.

The capsule will be initially designed for a larger driver, with custom coarse nap fabric liners then being provided for individual drivers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Seating apparatus for a race car comprising a capsule having a contoured base wall and side walls defining a trough with a concave torso receiving section and a convex leg receiving section for receiving and protecting substantially the entire body of a driver, a wrap-around headrest at the upper end of said base wall and including a rear wall and forwardly extending wings adapted to substantially surround a driver's helmet, a chest plate, means connecting said chest plate between said sidewalls and including stop means for transmitting a force imposed on the plate directly to said side walls to prevent crushing of the driver's rib cage, said capsule being removable from a race car with an injured driver immobilized therein, said torso receiving section and said leg receiving section hinged together to facilitate removal of said capsule and driver from a car.

2. The apparatus described in claim 1, comprising means for mounting said capsule in a race car with controlled forward movement after a collision, thereby absorbing energy and reducing injury to a driver.

3. The apparatus described in claim 2, comprising a tether connected between said capsule and a driver's helmet for controlling movement of said helmet after a collision.

4. The apparatus described in claim 1, comprising inertial means for controlling movement of a driver relative to the race car after a collision.

5. The apparatus described in claim 1, comprising a tether connected between said capsule and a driver's helmet for controlling movement of said helmet after a collision.

6. The apparatus described in claim 2, comprising inertial means for controlling movement of a driver relative to the race car after a collision.

7. Seating apparatus for a race car comprising a capsule having a contoured base wall and side walls defining a trough with a concave torso receiving section and a convex leg receiving section for receiving and protecting substantially the entire body of a driver, a wrap-around headrest at the upper end of said base wall and including a rear wall and forwardly extending wings adapted to substantially surround a driver's helmet, means removably mounting said capsule in a race car so that said capsule and an injured driver immobilized therein may be removed together from the car, said torso receiving section and said leg receiving section hinged together to facilitate removal of said capsule and driver from a car, and inertial reel means for controlling movement of a driver relative to the race car after a collision.

8. The apparatus described in claim 7, said inertial reel means including a tether connected between said capsule and a driver's helmet for controlling movement of said helmet after a collision.

9. The apparatus described in claim 7, said mounting means including energy absorbing means permitting controlled forward movement of said capsule after a collision to dissipate impact forces.

* * * * *